March 27, 1951     W. J. LEVERIDGE     2,546,365
PNEUMATIC OPERATING CLUTCH DEVICE
Filed April 25, 1947
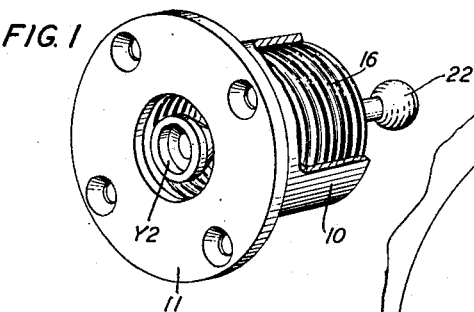
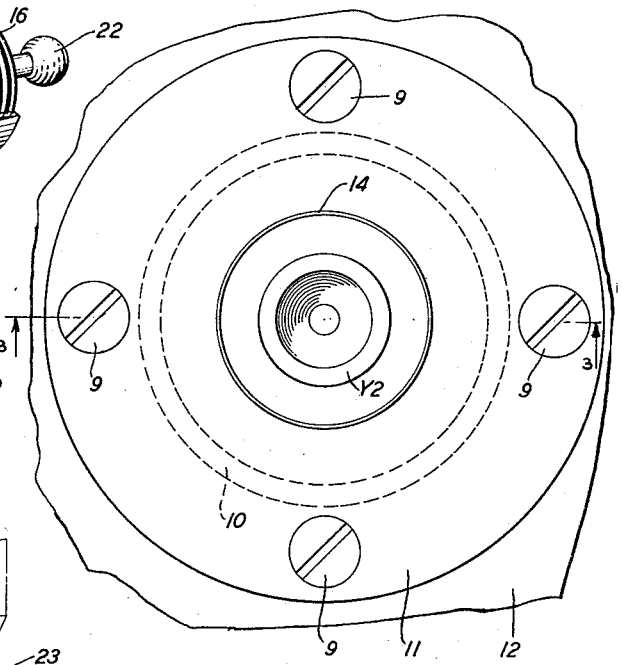
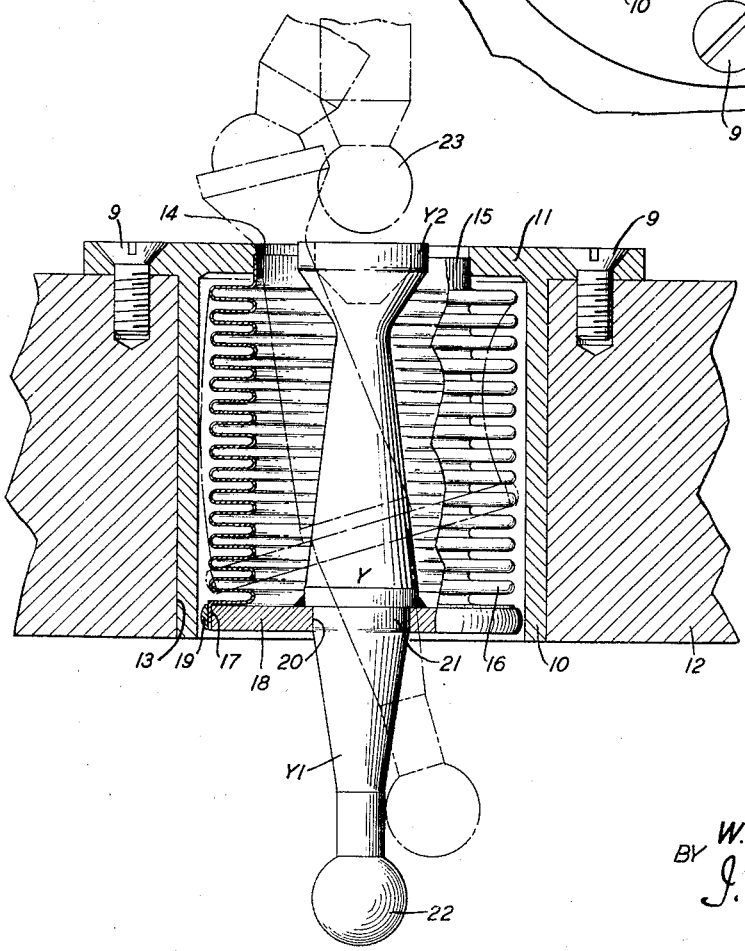
INVENTOR
W. J. LEVERIDGE
BY J. MacDonald
ATTORNEY

UNITED STATES PATENT OFFICE 2,546,365

PNEUMATIC OPERATING CLUTCH DEVICE

Walter J. Leveridge, Tuckahoe, N. Y., assignor to Bell Telephone Laboratories, Incorporated, New York, N. Y., a corporation of New York Application April 25, 1947, Serial No. 743,978

4 Claims. (Cl. 74—469)

This invention relates to pneumatically operated clutch mechanisms.

The metallizing of paper for use in certain types of electric condensers as is well known is effected by apparatus enclosed in a casing from which the air has been evacuated. Such apparatus, however, requires adjustments which must be effected from the outside of the casing as for controlling the speed of the paper while being wound on and from spools or for slightly shifting the position of the crucible containing the vaporizing metal. For certain special applications other internal adjustments need be made during the operation of the metallizing equipment. It is often necessary, however, to shift the position of these internal parts of the apparatus during the times when not in operation, as for refilling the crucible. Difficulty and delay arise though in disengaging the usual types of direct clutch connections which are maintained connected both when the apparatus is in operation and when it is not.

The object of the present invention is the provision of a clutch mechanism of the type above referred to which will be simple in construction, and positive in operation while forming an efficient seal between the inner and outer sides of the casing housing the metallizing apparatus.

A further object is to provide such a clutch mechanism which will automatically engage with the internal member to be moved upon evacuating the casing and will automatically disengage upon restoring the casing to normal atmospheric pressure.

In the drawing:

Fig. 1 is an assembly view shown in perspective;

Fig. 2 is an end view enlarged showing the clutch secured in position on a support in the form of a wall of the casing enclosing the metallizing apparatus; and Fig. 3 is a longitudinal sectional view taken on line 3—3 of Fig. 2.

According to the construction of the pneumatically operating clutch mechanism of this invention, a bushing 10 is provided with a circular flange portion 11 which may be secured air tight as by a plurality of screws 9 to the inner disposed side of one of the walls 12 of a casing housing the metallizing apparatus, the bushing 10 being closely fitted into a cylindrical opening 13 formed in the wall 12.

The flange 11 is provided with a circular opening 14 for receiving a rim 15 formed at one end of a bellows 16 and secured to the flange as by soldering. The opposite end portion of bellows 16 is formed with a rim portion 17 fitted over the periphery of a disc member 18 and secured thereto as by soldering, while a ring 19 of a diameter corresponding to the inside diameter of bushing 10 is secured onto the periphery of rim 17 in cooperation with disc 18 to serve as a pivot for a yoke member Y the function of which will be hereinafter described in detail. The disc 18 is provided at its center portion with an opening 20 for receiving the cylindrical portion 21 of the yoke member Y, the latter having one of its arms Y1 terminating in the form of a sphere 22, while the arm Y2 of the yoke extends normally in concentric relation to the longitudinal axis of the bellows 16, and terminates in the form of a cup-shaped portion serving to engage its complement clutch portion formed with a driven member 23 operatively connecting with the paper metallizing apparatus (not shown) housed in the casing of which wall 12 forms a part.

In the operation of the clutch mechanism of the invention considering the yoke member Y in the non-operated position as shown in Fig. 3, a decrease in the atmospheric pressure into the casing causes the compression of bellows 16 thereby moving the yoke member Y longitudinally from the position shown in Fig. 3 to the position wherein the cup-shaped portion Y2 of this yoke engages with the spherical-shaped portion of driven member 23 of the controlled apparatus in the casing. The driven member 23 may then be operated by imparting cranking movement to the yoke Y from the outside of the casing. The bellows returns the yoke member Y to normal position following the opening of the casing when the atmospheric pressure becomes equal on both sides of the disc in the bushing and the clutch is now ready for a successive operation. When the casing is evacuated and the driven member 23 is engaged by the yoke member Y, the presure differential causes the yoke member Y to bear with considerable force against the driven member 23 and, therefore, against its support or pivot. By selecting the position of the driven member 23 and its distance from the cup-shaped portion Y2 of the yoke this unwanted force against the pivot of the driven member 23 can be reduced considerably.

What is claimed is:

1. A pneumatically operable clutch mechanism for an evacuated enclosure comprising a bushing, a bellows having one of its ends secured to one end of said bushing, a disc member secured to the other end of said bellows, a yoke member carried by said disc, a first clutch element at one end of said yoke extending into said enclosure, and a complementary clutch element positioned in said enclosure adjacent said first clutch element but separate therefrom when no pressure differential exists between the interior of said enclosure and the atmosphere exterior thereto and engaging said first clutch element following an atmospheric pressure difference on the opposite sides of said disc member.

2. A pneumatically operable clutch mechanism comprising a bushing having a flange element for securing said bushing to one of the walls of a casing, a bellows, said flange element having means for securely receiving one end of said bellows, a disc member having its periphery secured to the opposite end of said bellows, a ring fitted over the periphery of said bellows in concentric relation to said disc to serve as a pivot for said disc, and an operable member carried by said disc having a clutch element formed at one end thereof for engaging a complemental clutch element upon a pressure difference acting on both sides of said disc.

3. A pneumatically operable clutch mechanism for an evacuated enclosure comprising a disc member, a yoke secured substantially at its middle length to the central portion of said disc, a bellows having one of its end portions secured at the periphery of said disc, a bushing serving as a casing for said bellows having a flange portion, said bellows having its other end portion terminating in the form of a rim, said rim being connected to said bushing, a first clutch element formed at one end of said yoke within said enclosure, and a complementary clutch element positioned within said enclosure adjacent said first clutch element but separate therefrom when no pressure differential exists between the sides of said disc and engaging said first clutch element upon the operation of said bellows by a difference in pressure on the sides of said disc.

4. A pneumatically operable coupling device for an evacuated enclosure comprising a cylindrical casing having a flange portion at one end thereof, a bellows in said cylindrical casing having one end secured to said flange portion to form an air seal therewith, a yoke member having a disc element formed at its middle length portion for connection with the opposite end of said bellows to form an air seal therewith and holding said yoke in concentric relation to the longitudinal axis of said bellows, said bellows permitting the eccentric movement of said yoke, a first clutch element at one end of said yoke extending into said enclosure, and a complementary clutch element positioned within said enclosure adjacent said first clutch element but separate therefrom when no pressure differential exists on the opposite sides of said disc element and engaging said first clutch element on the longitudinal movement of said yoke upon a pressure differential between the opposite sides of said disc element.

WALTER J. LEVERIDGE.

REFERENCES CITED

The following references are of record in the file of this patent:

UNITED STATES PATENTS

| Number | Name | Date |
|---|---|---|
| 635,684 | Herschmann | Oct. 24, 1899 |
| 1,157,793 | Metten | Oct. 26, 1915 |
| 1,378,118 | Jacobson et al. | May 17, 1921 |
| 1,624,348 | Mallory | Apr. 12, 1927 |
| 2,046,477 | Ohmart | July 7, 1936 |
| 2,065,834 | Swennes | Dec. 29, 1936 |
| 2,107,090 | Swennes | Feb. 1, 1938 |
| 2,177,674 | Schweizer | Oct. 31, 1939 |
| 2,190,326 | Benoit | Feb. 13, 1940 |
| 2,397,207 | Sachteleben | Mar. 26, 1946 |
| 2,403,199 | Swope | July 2, 1946 |
| 2,417,108 | Guibert et al. | Mar. 11, 1947 |

FOREIGN PATENTS

| Number | Country | Date |
|---|---|---|
| 555,879 | Great Britain | Sept. 10, 1943 |